United States Patent [19]
Böhm et al.

[11] 4,140,167
[45] Feb. 20, 1979

[54] SEALANT LAMINATES

[75] Inventors: Georg G. A. Böhm, Akron; John N. Anderson, Tallmadge, both of Ohio

[73] Assignee: The Firestone Tire & Rubber Company, Akron, Ohio

[21] Appl. No.: 737,884

[22] Filed: Nov. 2, 1976

Related U.S. Application Data

[63] Continuation-in-part of Ser. No. 716,493, Aug. 20, 1976, abandoned.

[51] Int. Cl.$^2$ ............................................... B60C 17/00
[52] U.S. Cl. .................................... 152/346; 156/115; 204/159.14; 526/57
[58] Field of Search .................. 152/330 R, 346, 347, 152/348; 260/2.3, 2 EP; 526/57; 204/159.14; 156/110 R, 115, 123

[56] References Cited

U.S. PATENT DOCUMENTS

| | | | |
|---|---|---|---|
| 639,104 | 12/1899 | Shaw | 152/346 |
| 2,632,492 | 4/1953 | Placentino | 156/115 |
| 2,657,729 | 11/1953 | Hardman et al. | 152/347 |
| 2,806,821 | 9/1957 | Hill | 260/2.3 |
| 2,809,944 | 10/1957 | Sverdrup | 260/2.3 |
| 3,563,294 | 2/1971 | Chien | 152/346 |
| 3,697,622 | 10/1972 | Kehr | 204/159.14 X |
| 3,704,108 | 11/1972 | Alpert | 260/2.3 X |
| 3,952,787 | 4/1976 | Okado et al. | 152/347 |
| 3,959,103 | 5/1976 | Larsen | 204/159.14 X |
| 4,044,187 | 8/1977 | Kremkau | 204/159.14 X |

FOREIGN PATENT DOCUMENTS

| | | | |
|---|---|---|---|
| 1358209 | 7/1974 | United Kingdom | 152/330 R |
| 1358210 | 9/1974 | United Kingdom | 152/330 R |

*Primary Examiner*—Francis S. Husar
*Assistant Examiner*—D. W. Underwood

[57] ABSTRACT

This disclosure relates to a sealant material to be primarily used in pneumatic tires to seal punctures made by external objects, such as nails. The sealant may be a single layer or a laminate of sealant layer and covered layers. The sealant layer contains a material that is at least partially degraded by irradiation or heat in the presence of a peroxide. The laminate may be in sheet or strip form with various cross-sectional shapes. The layers in the laminate comprise rubber compounds, some of which may contain agents which either assist or retard cure by irradiation so that the layers will have different physical characteristics during the manufacture of end products containing the laminate. The laminate may be cured by any known method, either irradiation or thermal, after its assembly into the final product.

7 Claims, 6 Drawing Figures

SEALANT LAMINATES

BACKGROUND OF THE INVENTION

This is a continuation-in-part application of Ser. No. 716,493 filed Aug. 20, 1976, now abandoned.

This invention relates to a laminate composite sheet or strip of rubber compound which is made up of several separate layers of specifically designed rubber compound. The laminate may be made by any of the known methods, such as calendering and the like; however, it is preferred that the laminate be formed by a process known as coextrusion in which two or more rubber compounds passed through the preform die to form separate layers which are joined in the final die. A recent technique for this is disclosed in U.S. Pat. Nos. 3,479,425 and 3,557,265. This coextrusion process has been applied to plastics and thermal plastic elastomers to form laminates thereof.

This invention is specifically related to a laminate that contains a sealant layer, or the layer itself, wherein the layer contains a material that is at least partially degraded when exposed to irradiation or heat in the presence of a peroxide. In addition, the sealant layer may also contain a material that is partially cured by these same treatments.

In this invention the term "degrade" is used to characterize a chain scission type reaction in the polymer phase. The term "cure" is used to characterize a cross-linkage type reaction in the polymer phase.

The use of layers of sealant material in pneumatic tires to seal punctures is well known in the art; for example, see U.S. Pat. Nos. 3,048,509; 3,628,585 and 2,877,819. These teachings disclose a laminate in which the sealant layer is encased in one or more cover layers to retain the flowable, soft, sealant layer in its proper location during the service life of the tire. Use of a sealant layer without these cover layers is also disclosed. The laminates taught by these references comprise a sealant layer of unvulcanized rubber and cover layers of rubbers that are vulcanized during the tire curing operation. The sealant layer is devoid of materials which would cause vulcanization.

Additionally, other laminated articles are known in which the separate layers comprise materials which have different properties. Such articles have been utilized in the manufacture of tires wherein a stiff, partially cured rubber compound has been sandwiched between two layers of soft, tacky, uncured rubber compound by calendering the soft layers onto the already partially cured compound. Strips of this type have been employed in the bead area of the tire, where the tire contacts the rim, as an abrasion gum strip, to resist the chafing that takes place between the tire and the rim.

In all laminates, an uncured rubber compound tends to flow during the curing operation, thereby decreasing its effective gauge or thickness. In the above described type of composite strip the partial precure of the stiff compound enables it to retain its gauge or thickness during the tire curing operation, but the precure renders the strip inherently dry, causing an adhesion problem between it and the other parts of the tire during the building and curing operation. The external layers of the soft, tacky, uncured rubber compound in the laminate help to overcome this deficiency and provide the necessary uncured adhesion so that the composite strip will not separate from the remaining pieces of the tire prior to its final cure. However, there is still an adhesion problem because layers (the external layers) are being adhered to a partially cured layer.

Additionally, all of these prior composite strips have been difficult and expensive to manufacture. The process has been to calender the inner, stiff strip; subject it to a curing operation in which it is partially cured; and then calender the soft, tacky strips on both sides of the then stiff strip to form the final composite laminate. With the sealant type laminates, the soft, uncured layer is calendered onto the soft cover layers. These operations have been expensive and time consuming in the past and involve several steps. Due to the limitations of the calendering operation, it has also necessitated the use of thicker strips for an adequate safety margin than are necessary to perform the functions in the final product.

The product of this invention has greatly simplified and improved the composite strip technology thereby enabling the use of multilayer composite strips in pneumatic tires as the air impervious liner which covers the inner periphery of the tire.

In prior sealant laminates where the material is a fluid or semi-fluid great difficulty has been encountered in the manufacturing operation. The fluid or semi-fluid nature of the material results in inherent processing difficulties in trying to obtain this material in a workable form and retain it in this form until the final product is finished. The present invention eliminates these drawbacks. In the present invention the material is in a solid, workable form during the initial manufacture; that is, the construction of the laminate. In the radiation cure system the material retains its solid character until the irradiation step where it attains its fluid or semi-fluid character. This does not occur until after the laminate has been constructed and the fluid layer is surrounded by solid material that remains solid. In the peroxide system the material retains its solid condition until the final curing operation in the manufacture of the product, such as the pneumatic tire.

The technology and invention of this application are not limited to this place in a pneumatic tire. The technology may be applied to any of several end products, such as conveyor belts, containers and industrial products.

The product of the invention is particularly useful where it is necessary to have one material retain a certain thickness in the end product. This has usually been accomplished in the past by using an excess amount of material to insure the minimum is present in the final product after it has thinned out in the processing steps. The prior partial pre-cure method, although a help, still had this deficiency because only a partial cure could be obtained; a full cure would have rendered the cured stock unusable due to its poor adhesion.

This invention provides an improved laminate by selectively altering some of the layers in the laminate so that the layers will either be uneffected, partially cured, fully cured, partially degraded or fully degraded when subjected to irradiation or heat in the presence of a peroxide.

This technique eliminates at least one of the steps necessary in the prior processes. In this technique, the composite strip is obtained by calendering or, preferably, by coextrusion. The rubber compounds in the various layers may be selectively either sensitized or desensitized to react to irradiation in various degrees. The composite strip is then subjected to irradiation wherein the sensitized layer or layers are partially cured or fully cured and the desensitized layer or layers are uneffected. One of the layers also contains a material that will degrade on exposure to irradiation or a blend of a degradable material and a cross-linkable material. The degradation and cross-linkage may also be obtained by heating in the presence of a peroxide. This results in the different layers in the composite having different physical characteristics which may be utilized in the ultimate manufacture of the end product.

It is an object of this invention to provide a laminate which can be manufactured in a relatively cheap and uncomplicated manner.

It is a further object of this invention to provide a laminate in which the thickness of the separate layers is dictated by the amount of the layer necessary to perform its function and not by the problems inherent in the manufacture of the laminate.

It is a further object of this invention to provide a laminate in which some of the layers are sensitized to partially cure or totally cure when subjected to irradiation and other layers are desensitized to be uneffected by irradiation.

It is a further object of this invention to provide a sealant layer or laminate in which one layer contains a material that will at least partially degrade when exposed to irradiation or heat in the presence of a peroxide.

It is a further object of this invention to provide a sealant layer or laminate in which one layer contains a blend of a material that will degrade on exposure to irradiation or heat in the presence of a peroxide and another material that will at least partially cross-link on exposure to irradiation or heat in the presence of a peroxide.

These and other objects will be evident from the detailed description of the invention which follows.

SUMMARY OF THE INVENTION

This invention relates to the technology of obtaining a composite laminate of several layers of material and the resulting laminate. It is known that rubber compounds may be sensitized to cure or partially cure when subjected to irradiation. Also, it is known certain materials will degrade when exposed to irradiation or heat in the presence of a peroxide. The invention's utilization of these concepts is novel in that it may yield laminates with layers having sensitizing materials, layers having desensitizing materials, and layers having degraded materials. This results in the laminate having cured layers, relatively uncured layers and degraded layers after it has been subjected to irradiation. This technique enables the production of composite laminates in which predetermined layers have predetermined physical characteristics which are desirable in the manufacture of the ultimate end product.

For example, the innerliner in a pneumatic tire must be sufficiently impervious to air to prevent the air in the inflation chamber from entering into the tire. If the air does enter into the tire, it will expand due to the heat generated during operation and will eventually cause a separation in the tire. The more air impervious materials, for example, the halogenated butyl rubbers, do not possess good building tack and adhesion, are soft, and will thin out in the high pressure areas when the tire is expanded and vulcanized in the vulcanizing process.

It is necessary that the innerliner be sufficiently air impervious and retain its dimensional stability so that it will not thin out in these high pressure areas of the tire yielding an insufficient thickness to effectively stop the air passage throughout the entire inner periphery of the tire so that the minimum thickness is maintained in the high pressure areas (the tread shoulders) of the tire. This invention may eliminate the necessity for providing a thick innerliner across the entire periphery of the tire by profile extrusion. When this technique is utilized, it is possible to extrude a contoured innerliner in which the thickness is increased in the high pressure areas of the tire without an increase in the thickness in the low pressure areas. This results in a significant savings of material as the minimum amount of material necessary may be utilized across the entire periphery of the innerliner.

This invention also enables the manufacture of an innerliner in which inner layers of the laminate may be designed to give certain characteristics to the overall laminate and the outer layers may be designed to give building adhesion so that separations will not occur prior to the vulcanization of the tire. This is accomplished by having one of the inner layers comprised of a halogenated butyl compound which will give the necessary air impermeability, another inner layer comprised of a polybutadiene rubber compound which provides the stiffness on exposure to irradiation so that it will maintain its dimensional integrity during the vulcanization operation, and an outer layer on both sides comprised of a natural rubber compound having sufficient tack to adhere to the contiguous components of the tire and to itself in the splice area of the innerliner. The two inner layers may be sensitized to cross-link or cure on exposure to irradiation whereas the outer layers are desensitized so that such irradiation treatment does not effect any tacky characteristics. This composite strip can be manufactured at much lower gauges than the prior art strips due to this technique, thereby saving a considerable amount of raw materials and costs.

The innerliner laminate also contains a layer of material which will have sealant properties in the end product. The layer with sealant properties will be in a condition that permits easy processing during the manufacture of the laminate and until it is subjected to the treatment which will degrade one of the materials in the laminate. This degradation results in a softening of the sealant material to a soft or semi-fluid or fluid composition. In this degradation process a relatively high molecular weight material is degraded (chain scission) to a lower molecular weight material which is more fluid. The degradable material will act as, and process as, a high molecular weight material until the degradation step.

This degradation is obtained either by irradiation or by heat in the presence of a peroxide. One such material which will degrade upon exposure to irradiation or upon the application of heat in the presence of a peroxide is polyisobutylene (PIB) and its copolymers. Another such material is a polyethylene oxide. These materials are mixed with carbon black and oil to achieve desired end properties. Such a rubber compound will be degraded upon exposure to irradiation. Alternatively, a peroxide may be added to this compound so that the compound will degrade on exposure to heat and the irradiation step eliminated.

The sealant layer may contain a blend of one of the degradable materials mentioned above and a cross-linkable material along with carbon black and oil. The cross-linkable material may be any of the diolefin elastomeric types, either copolymers or homopolymers. The ratio of the degradable material to the cross-linkable material in the blend is within the range of 25% degradable - 75% cross-linkable to 75% degradable - 25% cross-linkable. Such blends may be heterogeneous or non-miscible having a continuous phase and a discontinuous phase. The blend may also be a co-continuous mixture of the degradable and cross-linkable materials when appropriate mixing techniques are used.

If a heterogeneous blend is formed, the degradable material is contained in the discontinuous phase, as the dispersed phase, and the cross-linkable material for the continuous phase, as the matrix phase. It has also been found that the levels of carbon black and oil are important to processability.

The physical character of the sealant layer may range from a fluid to a semi-fluid or a solid type consistency. This fluid nature is directly proportional to the amount of degradable material (low molecular weight material) present in the layer; that is, as the amount of low molecular weight material increases, the sealant layer becomes more fluid or more soft. When the sealant layer contains no high molecular weight material, its final consistency, after irradiation or heat in the presence of a peroxide is fluid or very soft in nature. When higher levels of the cross-linkable material (high molecular weight) are present, the final consistency of the sealant layer is solid in nature.

In the ratios disclosed above adhesion problems may occur between the sealant layer and other layers. This type of problem is more predominant when the sealant layer contains higher levels of the degradable material. with layers of different materials depending upon the properties desired and the end use.

Any of the standard, rubber curing peroxides may be utilized in the peroxide system used to obtain the degradable material. Examples of such peroxides are dicumyl peroxide and Varox powder which is a blend of inert filler with 50% of 2, 5-bis (t-butylperoxy) 2, 5 dimethylhexane.

Several chemicals have been found useful to accelerate, in varying degrees, the cure of rubber compounds by irradiation and several chemicals have been found useful to inhibit the cure of rubber compounds by irradiation. These promoters and retarders are classified as sensitizing or desensitizing agents. The type of rubber utilized in the compound is critical and dictates the type of promoter or retarder that will function. The type of promoter or retarder will vary when different types of rubbers are used in the compound and the amount of these chemicals may vary depending upon the type of rubber used or the dosage (amount) of irradiation which the rubber compound receives.

Specifically, it has been determined that paradichlorobenzene (PDCB) is an effective promoter for irradiation cure in rubber compounds. It has also been determined that certain of the thioetherpolythiols are effective promoters. The specific polythiols which have been evaluated and found useful are set out in Table I. Compound 2 identified in this table was utilized in the examples which follow and is designed "TEPT" therein.

TABLE I

POLYTHIOETHER POLYTHIOLS DERIVED FROM
TRIENE-DITHIOL OR TRIENE-H$_2$S POLY ADDITIONS

| COMPOUND | THIOL FUNCT. SH. EQUIV./GM | IDEALIZED CHEMICAL STRUCTURE AND DERIVATION |
|---|---|---|
| 1 | .0050 | 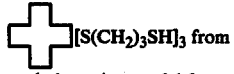 [S(CH$_2$)$_3$SH]$_3$ from cyclodocetriene and 1,3 propane dithiol. |
| 2 | .0082 | 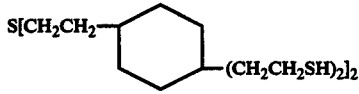 S[CH$_2$CH$_2$—⟨⟩—(CH$_2$CH$_2$SH)$_2$]$_2$ from trivinyl cyclohexane and H$_2$S. |
| 3 | .0045 | 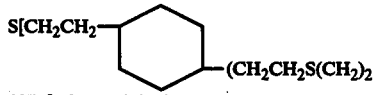 S[CH$_2$CH$_2$—⟨⟩—(CH$_2$CH$_2$S(CH$_2$)$_2$SH)$_2$]$_2$ from trivinyl cyclohexane and ethanol dithiol |
| 4 | .0041 | 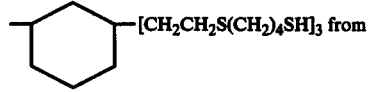 —⟨⟩—[CH$_2$CH$_2$S(CH$_2$)$_4$SH]$_3$ from trivinyl cyclohexane and 1,4 butane dithiol. |
| 5 | .0049 | 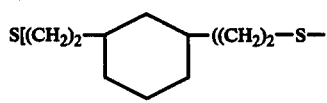 S[(CH$_2$)$_2$—⟨⟩—((CH$_2$)$_2$—S—(CH$_2$)$_3$SH)$_2$]$_2$ from trivinyl cyclohexane and 1,3 propane dithiol. |

The invention is not limited to a specific end use but may be employed in other end products, such as, liners for tanks and containers of all types, hoses and fabric reinforcement for the manufacture of tanks. It is envisioned that composite laminates may be manufactured It has also been determined that effective retarders of irradiation curing or cross-linking include aromatic oils, sulfur, sulfur cure accelerators and some rubber antioxidants and/or antiozonants of the substituted diphenylamine type, such as N-(1,3-dimethylbutyl)N'-phenyl-p-phenylene diamine.

Table II lists some commercial antioxidants/antiozonants which have been found useful as retarders of irradiation cure. A higher swelling ratio indicates more retarding effect. The swelling ratio were obtained by compounding one part of the particular antioxidant into 100 parts of polybutadiene rubber, subjecting the compound to 5 Megarads of irradiation, immersing the sample in toluene for 48 hours at room temperature and measuring the weight of the swollen rubber against the weight of the dry rubber.

TABLE II

| TEST | ANTI-OXIDANT | CHEMICAL COMPOSITION | SWELLING RATIO |
|---|---|---|---|
| 1 | None | — | 11.5 |
| 2 | DBPC | 2,6-di-t-butyl-para-cresol | 15.1 |
| 3 | Santowhite Crystals | 4,4'thiobis (6-t-butyl-m-cresol) | 13.6 |
| 4 | PBNA | phenyl beta-naphthylamine | 14.7 |
| 5 | Agerite White | syn-di-betanaphthyl-p-phenylene diamine | 11.9 |
| 6 | Santoflex 13 | N-(1,3-dimethylbutyl)-N' phenyl-p-phenylene diamine | 27.4 |

The dosage of irradiation which is utilized to accomplish this invention and the conditions under which the dosage is applied are dependent upon several variables; the type of rubber in the rubber compound, the promoter or retarder utilized in the rubber compound, the level of the promoter or retarder utilized in the rubber compound, the thickness of the layer of material, the thickness of adjacent layers of materials, the sequence of the layers of material, the number of the layers of material and whether the irradiation is applied to one or both sides of the composite strip. The proper combination is obtained to yield the desired physical properties in the laminate.

The dosage also may be controlled by conditions under which the dosage is applied, such as the amount of energy of the electron beam employed. This may be controlled so that the electrons do not completely penetrate the entire strip. This results in the irradiation of part of the strip, but not the entire strip.

DETAILED DESCRIPTION OF THE INVENTION

Figure 1:
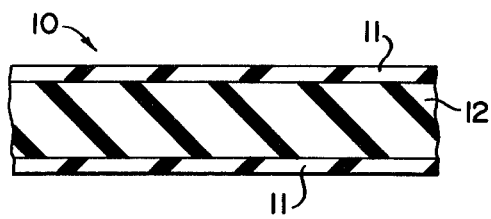
FIGS. 1 and 2 are partial cross-section views of this invention as embodied in a sealant containing innerliner for tires.

In FIG. 1 the laminate is shown generically as 10 having internal layer, 12, and two external layers, 11. The internal layer contains a material which will degrade when subjected to irradiation or heat in the presence of a peroxide, or a blend of the degradable material and one that cross-links when subjected to irradiation or heat in the presence of a peroxide. The outer layers, 11, are designed to be relatively uneffected by irradiation. They may comprise a rubber compound designed to have air impermeability properties or a rubber compound designed to have good building tack. An example of the latter type is a rubber compound comprising 100 parts of natural rubber, 45 parts of carbon black and other compounding ingredients, including the following which retard irradiation cross-links; Santoflex 13, Aromatic Oil, Sulfur and Sulfur Cure Accelerators.

When the irradiaton system is used, the laminate, 10, after its construction, is subjected to an irradiation treatment which will degrade the degradable material in layer 12, whether this material be blended with one that cross-links or not; will cross-link the cross-linkable material in layer 12, if any is present; and will have little effect on layers 11. The laminate is then placed in the final product and the subsequent processing steps accomplished to yield the final product, including the vulcanization thereof which cures layers 11 and does not degrade layer 12.

When the peroxide system is used, a peroxide compound is mixed into the internal layer. After the laminate is constructed it is placed in the final product and the product is cured. This curing process will degrade the degradable material in layer 12 whether this material be blended with one that cross-links or not; will cross-link the cross-linkable material in layer 12, if any is present; and will cure layers 11.

In the application of this invention, the laminate, 10, may be obtained by calendering or coextrusion. The coextrusion method is preferred as it provides better control of the thickness of the layers at lower gauges, gives better adhesion between the layers and permits the formation of laminates having contours at preselected positions, such as those shown in FIG. 3.

A laminate of the construction shown in FIG. 1 was assembled wherein the degradable, sealant layer, 12, comprised a compound having the following ingredients:

|  | Parts Per 100 Polymer |
|---|---|
| Solution styrene/butadiene polymer | 25 |
| Polyisobutylene | 75 |
| Carbon black | 60 |
| Oil | 40 |

This compound was calendered into a sheet 8 inches wide and 0.082 inches thick. A standard, halogenated butyl rubber containing innerliner compound was used for layers 11. Strips of this compound were calendered and faced on each side of the sealant layer. These external layers were 0.014 inches thick, making the total laminate 0.110 inches thick. This laminate was irradiated by two passes with a single side surface dose of 8.5 Megarads (MRADS). This resulted in a radiation dose of 10.8 MRADS on the back side of the laminate. A portion of this laminate was cured in a laboratory press and subjected to the laboratory puncture sealant test described below. This laminate yielded good air retention results on this test.

This cured laminate was placed in a laboratory apparatus to determine its sealing properties. The laminate was first covered with a backing layer of fabric coated with cured skim stock to provide support for the laminate during the test. In this apparatus a strip of the laminate covers a chamber which is supplied with an internal pressure by an air cylinder. The chamber is equipped with a gauge to measure the pressure in the chamber. The pressure is regulated by a valve between the cylinder and the chamber. The apparatus is so constructed that a nail may be driven into the laminate and then removed. Upon removal of the nail from the laminate, the pressure retained in the chamber is determined. The coverage of the nail with the sealant material is also evaluated.

In this test on the cured laminate described above, a 16 penny nail was repeatedly driven into and then pulled out of the laminate. The nail had a uniform coating of the sealant material after it had been pulled out. No significant air loss occurred in the chamber even after repeated nail punctures.

Tires have been manufactured and tested containing the laminate described above. Production tires were built containing this laminate by the following technique. During the production of a standard E78-14 size tire having two polyester cord body plies and two glass cord belt plies the sealant laminate was applied to the building drum. The splice in this strip was covered with a layer of the body ply compound. The remainder of the tire was built and vulcanized using standard methods and equipment. This resulted in a tire in which the crown area had an 8 inch wide strip of the sealant laminate, similar to the construction shown in FIG. 6.

This tire was tested according to a test specified by the General Motors Corporation for tires with puncture sealant capabilities. Under this test procedure the tire is mounted and inflated on its recommended rim. The tire is then run 2 hours at 50 miles an hour using its rated load and inflation on a laboratory tire testing wheel. After this break-in period, one of the center grooves of the tire is punctured with a 20 penny nail. The nail is removed, the tire air pressure is checked, and the hole is checked for air leakage by the application of a soap solution with any bubbles in the solution indicating air leakage. In the test on this tire no leakage was detected. The tire is the run for 1,000 miles on the test wheel, again at 50 miles an hour and rated load. At the end of this 1,000 miles, the tire is again checked for leakage with the soap solution and the inflation pressure is again checked. In this test no leakage was detected and the inflation pressure was the same as the initial inflation pressure.

At this time, a shoulder groove is punctured with the 20 penny nail and the nail is removed. The leakage and pressure checks are repeated and the tire is run a second 1,000 miles. At the end of the second 1,000 miles the leakage check procedure is repeated and the inflation is checked. Again, with this tire no leakage was dictated and no loss of inflation pressure was indicated.

At this time, a third puncture is made in the tire with the 20 penny nail in a groove intermediate between the center groove and the shoulder groove. The leakage and pressure tests are again performed on this third hole and the tire is then run another 1,000 miles. After this third 1,000 miles the tire is removed and the test is completed.

In the test performed on this tire, the tire was run 965 miles making a total mileage of 2,965. No leakage was found at any of the puncture holes at the end of the test and the inflation pressure was 0.5 psi less than the initial inflation pressure. It is believed that this pressure loss was due to the technique of measuring the pressure and not to any air loss through any of the punctures.

To demonstrate the feasibility of the feature of the differential properties in the laminate layers in this invention, laminates were manufactured having a layer of soft, natural rubber compound comprising 100 parts of natural rubber, 45 parts of carbon black and other compounding ingredients, such as Santoflex 13, aromatic oil, sulfur and sulfur cure accelerators, all of which have a desensitizing effect on irradiation cure, and a layer of a hard, rubber compound comprising 100 parts of a solution styrene/butadiene copolymer, 80 parts of reinforcing carbon black and four parts of PDCB, a sensitizing agent. In this laminate the soft, natural rubber compound had a thickness of 0.045 inches (0.1143 cm) and the hard, solution styrene/butadiene compound had a thickness of 0.035 inches (0.0889 cm). These layers were separated by two layers of Mylar and a blue cellophane dosimetry layer to measure the irradiation dosage used. Two identical pairs of laminate samples were initially subjected to irradiation on one side and were turned over and subjected to irradiation on the other side; a double side irradiation. After this irradiation step the laminates were disassembled. The layers of one of each pairs of such strips were checked for physical properties (stress-strain data). These results are set out in Table III under the column "Radiation Cure." The separated layers of the remaining irradiated strips were given an additional thermal cure for 10 minutes at 328 degrees F. in a 0.040 gauge mold and their physical properties were then obtained. These results are reported in Table III under the column "Radiation and Thermal Cure." Three separate tests were run in this manner, each at a different dosage as shown in Table III.

TABLE III

| TEST | RADIATION CURE | | RADIATION AND THERMAL CURE | |
|---|---|---|---|---|
| Rubber Compound | Desensitized Natural Rubber | Sensitized Stereon | Desensitized Natural Rubber | Sensitized Stereon |
| TEST 1 | | | | |
| Ave. Dosage 8.6 Megarads | | | | |
| Tensile Strength (psi) | 590 | 2285 | 2860 | 2490 |
| Modulus (psi) at | | | | |
| 100% elongation | 45 | 570 | 285 | 670 |
| 200% elongation | 75 | 1290 | 800 | 1815 |
| 300% elongation | 150 | 2240 | 1590 | — |
| Elongation at Break (%) | 560 | 300 | 445 | 260 |
| TEST 2 | | | | |
| Ave. Dosage 11 Megarads | | | | |
| Tensile Strength (psi) | 840 | 2620 | 2895 | 1695 |
| Modulus (psi) at | | | | |
| 100% elongation | 50 | 605 | 260 | 530 |

TABLE III-continued

| TEST | RADIATION CURE | | RADIATION AND THERMAL CURE | |
|---|---|---|---|---|
| | | | Desensitized | Sensi- |
| Rubber | Desensitized | Sensitized | Natural | tized |
| Compound | Natural Rubber | Stereon | Rubber | Stereon |
| 200% elongation | 90 | 1495 | 700 | 1200 |
| 300% elongation | 190 | 2515 | 1435 | — |
| Elongation at Break (%) | 630 | 315 | 460 | 260 |
| TEST 3 Ave. Dosage 12.3 Megarads | | | | |
| Tensile Strength (psi) | 855 | 2440 | 2595 | 2050 |
| Modulus (psi) at | | | | |
| 100% elongation | 55 | 705 | 220 | 610 |
| 200% elongation | 100 | 1745 | 690 | 1425 |
| 300% elongation | 205 | — | 1295 | — |
| Elongation at Break (%) | 595 | 265 | 455 | 265 |

This data clearly demonstrates the feasibility of this invention showing that the sensitized layer is cured by the irradiation step, the desensitized layer is not, the desensitized layer is cured by the subsequent vulcanization step and the sensitized layer is not adversely affected by the subsequent vulcanization step.

Figure 2:
Figure 5:
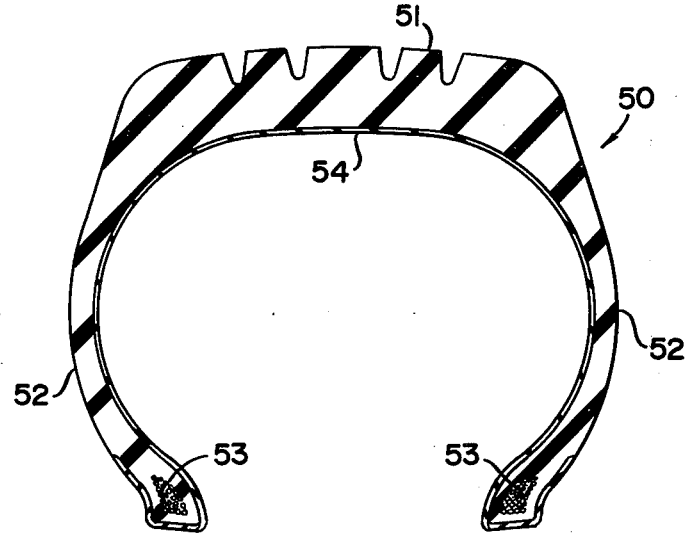
FIG. 5 is a cross-sectional view of a tire embodying this invention as an innerliner.

In FIG. 2 the sealant laminate is shown generally as 20 having two layers, 21 and 22. Layer 21 is the layer containing the degradable sealant type material. Layer 22 is the external layer which is used to cover the sealant material so that it will remain in its proper position in the end product. Layer 22 may be the standard tire innerliner compound or it may be a standard tire skim stock as previously described in this specification. FIG. 5, which will be discussed later, demonstrates the utilization of the laminate of FIG. 2 as a sealant layer in a pneumatic tire.

If a sealant material which will be degraded upon exposure to irradiation is used, the procedure for FIG. 1 will be followed. Alternatively, the peroxide system described in relation to FIG. 1 may be used. As explained in relation to FIG. 1, in this system the irradiation step is not utilized. Upon the application of heat, such as in the tire vulcanization step, the peroxide degrades the degradable material and cross-links the cross-linkable material.

This peroxide system may be utilized with a rubber compound containing 100% of degradable material (PIB) or blends of the degradable material with a cross-linkable diolefin. When blends are utilized, the split masterbatch technique of mixing is preferred to insure that the peroxide does not preferentially cross-link the cross-linkable material with a small amount of degradation in the degradable material.

In the split masterbatch technique, separate masterbatches are made containing 100 parts of the degradable or cross-linkable material with 60 parts carbon black and 40 parts oil. These separate masterbatches may then be blended in any desired proportions to obtain any ratio of degradable material to cross-linkable material that may be desired. The peroxide is added during this blending operation. By this technique the Applicants have made sealant layers with varying levels of the degradable material and have subjected these layers to the laboratory puncture sealant test described above. The results of these determinations are disclosed. Table IV along with a compound containing 100% of the degradable material.

TABLE IV

| PIB (Degradable) | 100 | 75 | 50 | 25 | 75 | 50 | 25 |
|---|---|---|---|---|---|---|---|
| Solution SBR (cross-linkable) | — | 25 | 50 | 75 | 25 | 50 | 75 |
| Carbon black | 60 | 60 | 60 | 60 | 60 | 60 | 60 |
| Oil | 40 | 40 | 40 | 40 | 40 | 40 | 40 |
| Peroxide | 2 | 2 | 2 | 2 | 1 | 1 | 1 |
| Seal | good | good | good | bad | good | good | bad |

This data demonstrates the feasibility of the peroxide system to obtain a material with puncture sealant properties. It is understood that the levels of oil, carbon black and peroxide, as well as the ratio of the degradable material to the cross-linkable material, are within the discretion of the persons skilled in the art and depend upon the specific nature of each ingredient used and the overall manufacturing system to which the compound is subjected.

Figure 3:
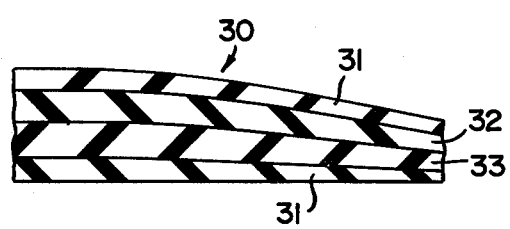
FIG. 3 is a partial cross-section view of this invention as embodied in a contoured, sealant containing innerliner for tires.

FIG. 3 represents another embodiment of the innerliner laminate of this invention. This figure demonstrates the contoured embodiment. In FIG. 3 external layers, 31, are comprised of a soft rubber compound designed to have good building tack and, when the irradiation system is used, these layers may be desensitized against curing by, for example, the inclusion of an antioxidant such as Santoflex 13. Internal layers 32 and 33 are shown as being thicker in certain predetermined areas. This excessive thickness may be prelocated in an area of the end product (in this case a pneumatic tire) where the laminate is subjected to the highest pressure in its shaping and curing operation. This extra thickness provides additional material in the high pressure areas which yields an end product with an adequate thickness of the material in the high pressure areas without having the extra thickness in lower pressure areas. This embodiment results in a savings of material.

In a pneumatic tire innerliner application of the contoured shape, the thicker areas of the laminate are located in the area of the tire that is subjected to the highest pressure in the shaping and curing operations or the greatest expansion in these operations. The extra thickness in high expansion areas prevents innerliner thinning out and cord shadowing (body cords actually striking through the thinned-out innerliner) that may occur in this area of the tire. By this Application, the contoured strip provides the necessary thickness in the troublesome areas without having to retain that thickness across the complete width of the strip as in prior laminates.

In FIG. 3 layer 32 may be a hard rubber layer which is sensitized to cure when subjected to irradiation. This layer may be comprised of a solution polybutadiene rubber and reinforcing carbon black. As such, this layer is utilized to retain the thickness of the laminate during the subsequent shaping and curing operations. Alternatively, this layer may be a hard rubber layer comprised of a halogenated butyl rubber and reinforcing carbon black. As such, this layer is the barrier layer which resists the passage of air from the internal air chamber of the tire into the tire.

The layer, 33, in FIG. 3 is the puncture sealant layer. It may be comprised of any of the sealant materials that are disclosed in this specification. It may contain a peroxide for the peroxide degradation system previously described or it may not and be used in the irradiation system previously described.

It is understood that additional layers may be included in any of the laminates disclosed in this specification or that any combination of the layers disclosed in this specification may be contained in one laminate. For example, a laminate may contain two external layers of soft rubber compound designed to have good building tack, and an internal sealant layer designed to seal when punctured and containing a material that is degraded upon exposure to irradiation or upon exposure to heat in the presence of a peroxide, another internal layer containing a halogenated butyl compound designed to provide a barrier against the passage of air and yet another internal layer of a hard rubber compound designed to cross-link when exposed to irradiation to provide a layer which will maintain the integrity of the laminate during subsequent processing steps.

Figure 4:
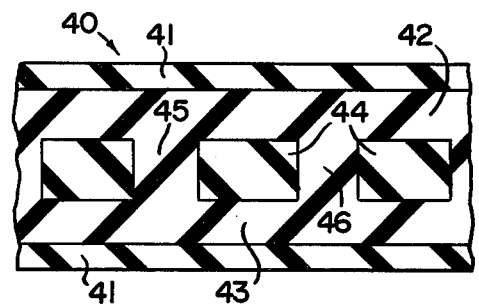
FIG. 4 is a partial cross-sectional view of another embodiment of this invention which is used for a self-sealing innerliner for tires.

FIG. 4 represents another embodiment of an innerliner laminate. In FIG. 4 the laminate is designated generically as 40. It contains two outer layers, 41, comprising a soft rubber compound which is designed to have good building tack and is desensitized against irradiation curing by, for example, the inclusion of an antioxidant such as Santoflex 13. Two intermediate layers, 42 and 43, are located inside of layers 41. These layers comprise a hard rubber compound containing halogenated butyl rubber and reinforcing carbon black which have been sensitized to cure on exposure to irradiation, for example, by the inclusion of TEPT. Between layers 42 and 43 is a layer of polyisobutylene, 44, without any sensitizing or desensitizing agents. This material may or may not contain some reinforcing material, such as carbon black. Bridges 45 and 46 of the same material utilized in layers 42 and 43 connect layers 42 and 43 to one another. These bridges form pockets which contain the layer 44.

When the laminate of FIG. 4 is subjected to irradiation, the layers 41 will be unaffected and will remain soft and tacky to provide adhesion during the subsequent processing steps for the end product. The layers 42 and 43 will partially or fully cure thereby providing a stiff, hard foundation for the composite laminate. The material in layer 44 will be degraded by chain scission and will form a liquid, pasty material. This laminate can then be applied as the innerliner of a tire and subjected to the later vulcanization step. The resulting tire will have an innerliner which contains pockets of the liquid polyisobutylene material. This material will act as a sealant to any punctures which may occur in the tire thereby giving the tire a self-sealing capability. The bridges 45 and 46 are necessary to maintain the integrity of the composite laminate after the irradiation step due to the fact that the layer 44 is liquified by the irradiation step.

The laminate of FIG. 4 is feasible because irradiation causes chain scission in the polyisobutylene while the cross-linking which occurs will not balance the degradation due to this chain scission reaction in this material. Standard butyl rubber, a copolymer of polyisobutylene and isoprene, is degraded to a certain degree by irradiation but this degradation is partially compensated by a concurrent cross-linking reaction. The same two compensating reactions occur in halogenated butyl rubbers except the cross-linking reaction is more predominant in the halogenated butyl than it is in the standard butyl. This performance of the butyl rubbers demonstrates the critical nature of the irradiation treatment and the criticality of selecting the proper sensitizing or desensitizing agents for each specific rubber.

It is envisioned that this chain-scission versus cross-linking situations may also be employed in a three layer laminate in which the two outer layers are soft, tacky rubber compounds desensitized to resist irradiation cure and the inner layer contains a blend of polymers, such as polyisobutylene and halogenated butyl rubber. Upon irradiation the polyisobutylene will degrade and form a liquid which will be trapped in the cross-linked halogenated butyl rubber. This composite would have self-sealing characteristics.

FIG. 5 represents a tire containing this invention. The tire is shown generically as 50 having tread 51, sidewalls, 52, and beads, 53. The placement of the innerliner of this invention on the inner periphery of the tire is shown as strip 54. The other feature of the tire may be any of the known constructions (radial, bias, belted-bias) for passenger, truck, airplane, off-the-road, tractor or industrial tires.

Figure 6:
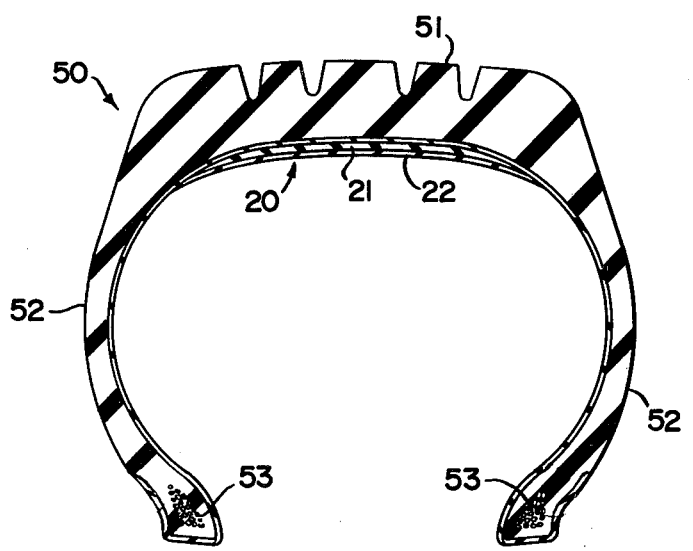
FIG. 6 is a cross-sectional view of a tire embodying this invention wherein the sealant layer is only located in the crown of the tire.

FIG. 6 represents a tire containing a sealant layer as described in FIG. 2. The basic components of the tire in FIG. 6 are identical to the components in FIG. 5. Additionally, FIG. 6 depicts the laminate, 20, of FIG. 2, with sealant layer 21 and cover layer, 22, in the crown area of the tire. This is the area where nail punctures predominantly occur. It is understood that layer, 22, of laminate, 20, may contain air-resistant properties such as those provided by halogenated butyl innerliner compounds.

Table V demonstrates the sensitizing and desensitizing characteristics of several chemicals on a rubber compound of the following basic formula:

Solution styrene/butadiene copolymer (SBR) — 100 parts
Reinforcing furnace black (CB) — 50 parts Each comparison is listed under a test number; the first column defines the ingredients in the above basic formula, the second column the modulus at different elongations and the last the average irradiation dosage to which each compound was exposed. In the tests the two compounds were laminated together and irradiated; the compounds were then separated and the physical properties of each determined.

TABLE V

| Test 1 | Modulus at Elongation | | | Dosage Ave. |
| --- | --- | --- | --- | --- |
|  | 100% | 200% | 300% | Megarads |
| SBR/CB | 187 | — | — | 7.3 |
| SBR/CB + 3.5 TEPT* | 1004 | — | — | 7.2 |
| Test 2 | | | | |
| SBR/CB + 3.5 TEPT* | 889 | — | — | 7.6 |

TABLE V-continued

| | | | | |
|---|---|---|---|---|
| SBR/CB + 3.5 Santoflex 13 | 127 | — | — | 7.2 |
| Test 3 | | | | |
| SBR/CB | 219 | 325 | — | 6.9 |
| SBR/CB + 1.5 TEPT, 2 PDCB** | 632 | 1824 | — | 7.1 |
| Test 4 | | | | |
| SBR/CB + 3.5 Santoflex 13 | 178 | 213 | — | 6.9 |
| SBR/CB + 1.5 TEPT, 2 PDCB | 623 | 1706 | — | 6.9 |
| Test 5 | | | | |
| SBR/CB + 1.5 TEPT, 2 PDCB, 30 naphthenic oil*** | 235 | 683 | 1447 | 8.3 |
| SBR/CB + 3.5 Santoflex 13, 30 aromatic oil**** | 48 | 57 | 68 | 8.0 |
| Test 6 | | | | |
| SBR/CB + 1.5 TEPT, 2 PDCB, 20 naphthenic oil | 315 | 1090 | — | 10.1 |
| SBR/CB + 3.5 Santoflex 13, 20 aromatic oil | 68 | 85 | — | 10.1 |
| Test 7 | | | | |
| SBR/CB + 1.5 TEPT, 2 PDCB, 10 naphthenic oil | 405 | 1165 | 2267 | 7.8 |
| SBR/CB + 3.5 Santoflex 13 10 aromatic oil | 88 | 110 | 145 | 7.6 |
| Test 8 | | | | |
| SBR/CB + 1.5 TEPT, 2 PDCB, 20 naphthenic oil | 325 | 1033 | — | 9.6 |
| SBR/CB + 3.5 Santoflex 13 20 aromatic oil | 55 | 55 | — | 3.5 |
| Test 9 | | | | |
| SBR/CB + 20 Naphthenic oil | 141 | 302 | 702 | 9.9 |
| SBR/CB + 20 Aromatic oil | 75 | 101 | 143 | 10.0 |
| Test 10 | | | | |
| SBR/CB + 3.5 TEPT | 293 | 963 | 1793 | 8.3 |
| SBR/CB + 3.5 Santoflex 13, 20 Aromatic oil | 57 | 72 | 92 | 8.2 |

*TEPT = Thioetherpolythiol (compound 2 in Table I)
**PDCB = p-dichlorobenzene
***naphthenic oil = Sunthene 4240
****aromatic oil = Dutrex 726

This data demonstrates the selective cure of the rubber compound in a laminate when the rubber compounds have been sensitized or desensitized to react to the irradiation treatment. All of the tests were subjected to the double side irradiation treatment except Test 6 which was irradiated on only one side; the side having the higher dosage.

Table VI demonstrates the application of this invention in a composite strip wherein the inner layer is cured by irradiation and the two outer layers are uneffected. These laminates were prepared with three layers each containing a solution styrene/butadiene copolymer, as indicated in Table V. Mylar film was placed between each layer to facilitate later separation. The laminates were subjected to a double side irradiation treatment; the layers were then separated and the physical properties determined for each layer.

TABLE VI

| Laminate A | Gauge (inches) | Dosage (Megarads) | Modulus at 300% Elongation (psi) | Tensile Strength (psi) | Elongation (%) |
|---|---|---|---|---|---|
| A. 100 SBR/70CB 40 aromatic oil/2 Santoflex 13 | .021 | 3.8 | 41 | 51 | 800 |
| B. 100 SBR/50CB/ 2 PDCB | .030 | 3.5 | 258 | 822 | 733 |
| C. 100 SBR/50CB/ 2 Santoflex 13 | .33 | 3.75 | 143 | 303 | 992 |
| Laminate B | | | | | |
| A. 100 SBR/70CB/ 2 Santoflex 13, 40 aromatic oil | .023 | 5.7 | 67 | 107 | 840 |
| B. 100 SBR/50CB/ 2 PDCB | .034 | 5.4 | 383 | 1391 | 713 |
| C. 100 SBR/50CB/ 2 Santoflex 13 | .035 | 6 | 196 | 628 | 860 |

This data demonstrates the irradiation cure of the sensitized inner layer of a three layer laminate while the desensitized outer layers are uneffected by the irradiation treatment. The outer layers retain their building tack while the inner layer is hardened and will retain its dimension.

The dosage received by the layers in the above examples was measured by the use of strips of blue cellophane containing methylene blue dye. These strips were applied to the top and bottom of the laminates to be irradiated. Optical density measurements were taken on the strips before and after irradiation. The irradiation reduces the dye to a colorless state with the amount of bleaching being proportional to the irradiation dose received by the strip.

The dose on the strip is determined from a plot of the change in optical density (before and after irradiation) as a function of dose size. The average dosage on a layer is calculated from the surface dose and a previously determined depth-dose distribution curve for the particular electron accelerator being used. A uniform dosage throughout each layer is obtained by a proper selection of the amount of electron energy and the double side dosage technique.

This invention takes maximum advantage of the laminate theory that the greater the number of interfaces, the greater the resistance to flow of the laminate. This invention makes possible laminates containing more layers and thinner layers than previously obtained. The interfaces more evenly distribute the expansion stresses and give the laminate more dimensional stability.

We claim:

1. A pneumatic tire comprising as one of its rubber elements a laminate comprising at least five layers of rubber compounds produced by providing at least two outer layers with a desensitizing agent which retards cross-linkage when subjected to irradiation, providing two inner layers of said laminate with a sensitizing agent which promotes cross-linkage when subject to irradiation, providing a middle layer located between said sensitized layers with a material which degrades when exposed to irradiation, assembling said laminate with said middle layer located between the two sensitized layers and the one of said desensitized layers located outside of each of said sensitized layers, subjecting said laminate to irradiation so that said layers are differentially cross-linked with said sensitized layers being cross-linked to a greater degree than said desensitized layers and said middle layer being degraded to yield a soft product, assembling said laminate into said tire and vulcanizing said tire.

2. A pneumatic tire comprising an annular, road-engaging tread surface, two sidewalls each connecting a side of said tread surface to an annular bead, reinforcing body plies extending from one bead to the other through the sidewalls and tread and a laminated innerliner member located radially inwardly of said reinforcing body plies, said laminated innerliner comprising at least two layers in which one of said layers contains a puncture sealant material, said tire manufactured by the steps comprising providing a first layer of said laminated innerliner with a polymeric material that cross-links on exposure to irradiation, providing a second layer of said laminated innerliner with said sealant material comprised of an irradiation degradable polymeric material that at least partially degrades on exposure to irradiation, assembling said layers into said laminate, subjecting said laminate to irradiation whereby said irradiation degradable polymeric material degrades to yield its sealant characteristics, assembling said laminate into said tire with said sealant layer located between said first layer and said reinforcing body plies, and vulcanizing said tire.

3. The tire of claim 2 wherein said degraded polymeric material is selected from the group consisting of polyisobutylene, copolymers containing polyisobutylene and polyethylene oxide.

4. The tire of claim 2 wherein said sealant layer comprises a blend of said irradiation degraded polymeric material and another irradiation cross-linked polymeric material.

5. The tire of claim 4 wherein said degraded polymeric material is selected from the group consisting of polyisobutylene, copolymers containing polyisobutylene and polyethylene oxide, and said cross-linked polymeric material is selected from the group consisting of natural rubber, copolymers of butadiene and styrene and halogenated butyl rubber, said polymeric materials being present in a ratio between 75% degraded-25% cross-linked to 25% degraded-75% cross-linked.

6. A vulcanizable pneumatic tire having an innerliner containing an irradiation degraded polymeric material with puncture sealing properties, said innerliner comprising a laminate of at least two layers of rubber compounds, the outer layer having a higher degree of cross-linkage than an inner, sealant layer, said sealant layer comprised of a blend of said irradiation degraded polymeric material and an irradiation cross-linked polymeric material, said degraded polymeric material selected from the group consisting of polyisobutylene, copolymers containing polyisobutyelene, and polyethylene oxide, and said cross-linked polymeric material selected from the group consisting of natural rubber, copolymers of butadiene and styrene, and halogenated butyl rubber, said polymeric materials being present in a ratio between 75% degraded-25% cross-linked to 25% degraded-75% cross-linked.

7. A pneumatic tire having an innerliner comprising a laminate of a puncture sealing layer and at least one other layer, said puncture sealing layer comprising a blend of a irradiation degraded polymeric material and an irradiation cross-linked polymeric material, said degraded polymeric material selected from the group consisting of polyisobutylene, copolymers containing polyisobutylene, and polyethylene oxide, and said cross-linked polymeric material selected from the group consisting of natural rubber, copolymers of butadiene and styrene, and halogenated butyl rubber, said polymeric materials being present in a ratio between 75% degraded-25% cross-linked to 25% degraded-75% cross-linked.

* * * * *